United States Patent [19]
Nikkanen et al.

[11] Patent Number: 6,058,696
[45] Date of Patent: May 9, 2000

[54] INLET AND OUTLET MODULE FOR A HEAT EXCHANGER FOR A FLOWPATH FOR WORKING MEDIUM GASES

[75] Inventors: John P. Nikkanen, West Hartford; Steven D. Sandahl, Glastonbury; Steven H. Zysman, Amston, all of Conn.; John C. DiTomasso, Agawam, Mass.

[73] Assignee: United Technologies Corporation, Hartford, Conn.

[21] Appl. No.: 08/996,268

[22] Filed: Dec. 22, 1997

[51] Int. Cl.⁷ ........................................ F02K 3/02
[52] U.S. Cl. ........................ 60/226.1; 60/262; 60/266
[58] Field of Search .................... 60/226.1, 226.3, 60/266, 262, 39.07, 39.092, 39.093

[56] References Cited

U.S. PATENT DOCUMENTS

| | | | |
|---|---|---|---|
| 3,910,375 | 10/1975 | Hache et al. | 60/226.1 |
| 4,254,618 | 3/1981 | Elovic | 60/226.1 |
| 4,474,001 | 10/1984 | Griffin et al. | 60/204 |
| 4,773,212 | 9/1988 | Griffin et al. | 60/39.02 |
| 4,819,425 | 4/1989 | Farquhar et al. | 60/226.1 |
| 5,269,135 | 12/1993 | Vermejan et al. | 60/226.1 |

*Primary Examiner*—Ted Kim
*Attorney, Agent, or Firm*—Gene D. Fleischhauer

[57] ABSTRACT

An inlet-outlet module 108 having both an inlet 58 and an outlet 62 for a heat exchanger system 52 is disclosed. Various construction details which improve the stiffness to weight ratio and the aerodynamic smoothness are developed. In one embodiment, the module 108 is formed of a one piece casting having a lobed mixer 94 at the outlet.

9 Claims, 4 Drawing Sheets

INLET AND OUTLET MODULE FOR A HEAT EXCHANGER FOR A FLOWPATH FOR WORKING MEDIUM GASES

CROSS REFERENCE TO RELATED APPLICATION

This application relates to copending U.S. patent application Ser. No. 08/996,009 entitled "Method for Cooling a Component of a Gas Turbine Engine", by Nikkanen et alia, and copending U.S. patent application Ser. No. 08/996,269 entitled "Heat Exchanger System for a Gas Turbine Engine", by Nikkanen et alia.

TECHNICAL FIELD

This invention relates to an inlet outlet module for a heat exchanger system for ducting cooling air with respect to a fan duct flow path of a gas turbine engine.

BACKGROUND

An axial flow rotary machine, such as a gas turbine engine for an aircraft, has a compression section, a combustion section and a turbine section. In typical fixed-wing aircraft, the engine is mounted in a housing attached to the wing of the aircraft. The housing is commonly referred to as a nacelle. The nacelle both supports and positions the engine with respect to the aircraft. An annular primary flow path for working medium gases extends axially through the sections of the engine. In aircraft installations, the compression section commonly includes a fan section having a bypass duct. The bypass duct provides an annular flow path for secondary working medium gases which extends rearwardly about the primary flow path.

A fan rotor assembly in the fan section includes an array of fan blades which extend outwardly across the primary and secondary flow paths. A plurality of fan exit guide vanes are disposed downstream of the fan blades in the fan duct to receive the relatively cool working medium gases of the secondary flow path. A plurality of struts are typically disposed downstream of the fan exit guide vanes to support the stator structure and to transmit loads from the engine to its supporting structure.

During operation, working medium gases are drawn along the primary flow path into the compression section. The gases are passed through several stages of compression, causing the temperature and the pressure of the gases to rise. The gases are mixed with fuel in the combustion section and burned to form hot pressurized gases. These gases are a source of energy to the engine and are expanded through the turbine section to produce work. A portion of this work is transferred to the compression section to drive the fan rotor assembly and its fan blades about an axis of rotation.

The working medium gases in the fan duct have a mass flow which is six to eight times the mass flow in the primary flow, but with a relatively small pressure rise and a modest temperature rise.

Various components in the engine generate heat such as an electrical generator or an oil system for providing lubricating fluid to rotating components in the engine. Oil or another liquid medium is used to carry away the heat is discharged to maintain operative temperatures of these components within acceptable limits to cooling air in the fan duct or another acceptable heat sink, such as fuel for the engine.

One construction using lubricating oil as a means for removing heat and rejecting it to heat exchangers is shown in U.S. Pat. No. 4,151,710, entitled "Lubrication Cooling System For Aircraft Engine Accessory", issued to Griffin et al. The heat is rejected primarily to a heat exchanger extending into the secondary flow path of the engine and secondarily to a heat exchanger in communication with fuel being flowed to the combustion chamber.

Another example of a cooling system is shown in U.S. Pat. No. 4,474,001, entitled "Cooling System For The Electrical Generator Of A Turbofan Gas Turbine Engine", issued to Griffin et al. In the second Griffin reference, this cooling system rejects excess heat to the engine fuel through a primary heat exchanger and at low fuel rates supplementary rejects heat to fan air flowed from the working medium flow path to a secondary heat exchanger which is located remotely from the fan duct. A valve is used to turn on and off the flow to the fan air (secondary) heat exchanger as required under operative conditions of the engine.

Still another approach is to provide a heat exchanger disposed in a compartment of the nacelle which receives air from two sources: a pressurized compartment in flow communication with the compressor of the engine at low power; and, fan air from the fan bypass duct at high power. Cooling air is flowed from these locations to the heat exchanger and dumped overboard. Valves are required to interrupt the flow from the pressurized compartment at high power and to interrupt the flow from the fan duct at lower power.

Another approach is to provide a flow path to a heat exchanger in a core compartment which extends from an inlet in the fan duct to an outlet at a downstream location in the fan duct. The outlet is spaced downstream a significant distance (several feet) such that the outlet is at a location having a lower static pressure than the inlet to the exchanger flow path. The inlet and outlet are spaced apart by this distance to avoid regions of the fan duct that have the same static pressure, which creates an adverse static pressure gradient (zero or slightly negative) between the inlet and outlet.

The inlet protrudes into the fan duct such that it is spaced from the inner wall and the outer wall. The inlet faces the oncoming flow and drives cooling air through the flow path to the heat exchanger because of the difference in static pressure between the inlet and the outlet. The inlet structure is exposed to foreign object damage from ice and other debris which is ingested into the engine and centrifugal away from the inner wall to the interior of the fan duct. Such debris impacts the inlet to the heat exchanger and may be carried downstream to the heat exchanger where the debris may strike and block the heat exchanger.

As the cooling air is passed through the heat exchanger, the cooling air receives heat from components that are cooled by the heat exchanger. The heated air is discharged into the fan duct at the downstream location. The discharge temperature of the cooling air from the outlet of the flow path for the heat exchanger may approach unacceptable levels for the adjacent structure. This results from the heat load and level of cooling flow even though the distance between the inlet and outlet creates a difference in static pressure. As a result, a metal shield may be installed downstream of the exhaust. The shield is heated, and material radially inwardly of the shield, such as composite structures, are protected from the hot exhaust.

The above art notwithstanding, scientists and engineers working under the direction of applicant's assignee have sought to develop proof cooling systems which avoid complex valving, adverse affects on the efficiency of the operating engine.

SUMMARY OF THE INVENTION

This invention is in part predicated on the recognition that a one piece casting for an inlet and outlet module may be tailored in thickness and shape to correctly reflect flow path contours with minimal wall thicknesses at non-critical locations and maximum thicknesses in critical locations.

According to the present invention, an inlet and outlet module for ducting cooling air from a working medium flow path and returning the cooling air to the flow path is formed of a one piece cast construction which includes an inlet, an outlet and flow path walls extending axially between the inlet and outlet to bound the working medium flow path.

In accordance with one embodiment of the present invention, the inlet has a ramp extending forwardly from the inlet and sidewalls which bound the ramp having decreasing height in an upstream direction and extending rearwardly from the inlet to the outlet.

In accordance with one detailed embodiment, a circumferentially extending surfaces extends from each sidewall of the heat exchanger inlet outlet module to define the inner flow path wall of a fan bypass duct In one detailed embodiment of the present invention, the thickness of the casting material in the area of the inlet opening is at least four times as thick as the material on at least one interior wall of the casting.

In accordance with one detailed embodiment, the inlet outlet module includes a inlet duct and an exhaust passage, the exhaust passage terminating in a lobed mixer.

A primary feature of the present invention is an inlet and outlet module for a heat exchanger which is formed as a one piece casting. Another feature is the absence of steps or gaps on the internal surfaces of the module which results from the one piece construction. Another feature is a ramp extending forwardly having side walls which extend forwardly from the inlet and of decreasing height in the upstream direction.

A primary advantage of the present invention is the stiffness to weight ratio of the inlet outlet module which results from its one piece construction. Another advantage is the engine efficiency which results from the precise contouring of the flow paths through the use of a casting and the precise alignment of the inlet and outlet with flow paths and the avoidance of steps in transition regions which would occur if this were not a one piece construction. In one embodiment, an advantage is the maintainability of a gas turbine engine which results from the ability to replace a module with an interchangeable cast module and the ability to remove the entire module to provide inspection of an associated heat exchanger for foreign object damage and blockage.

BEST MODE FOR CARRYING OUT THE INVENTION

Figure 1:
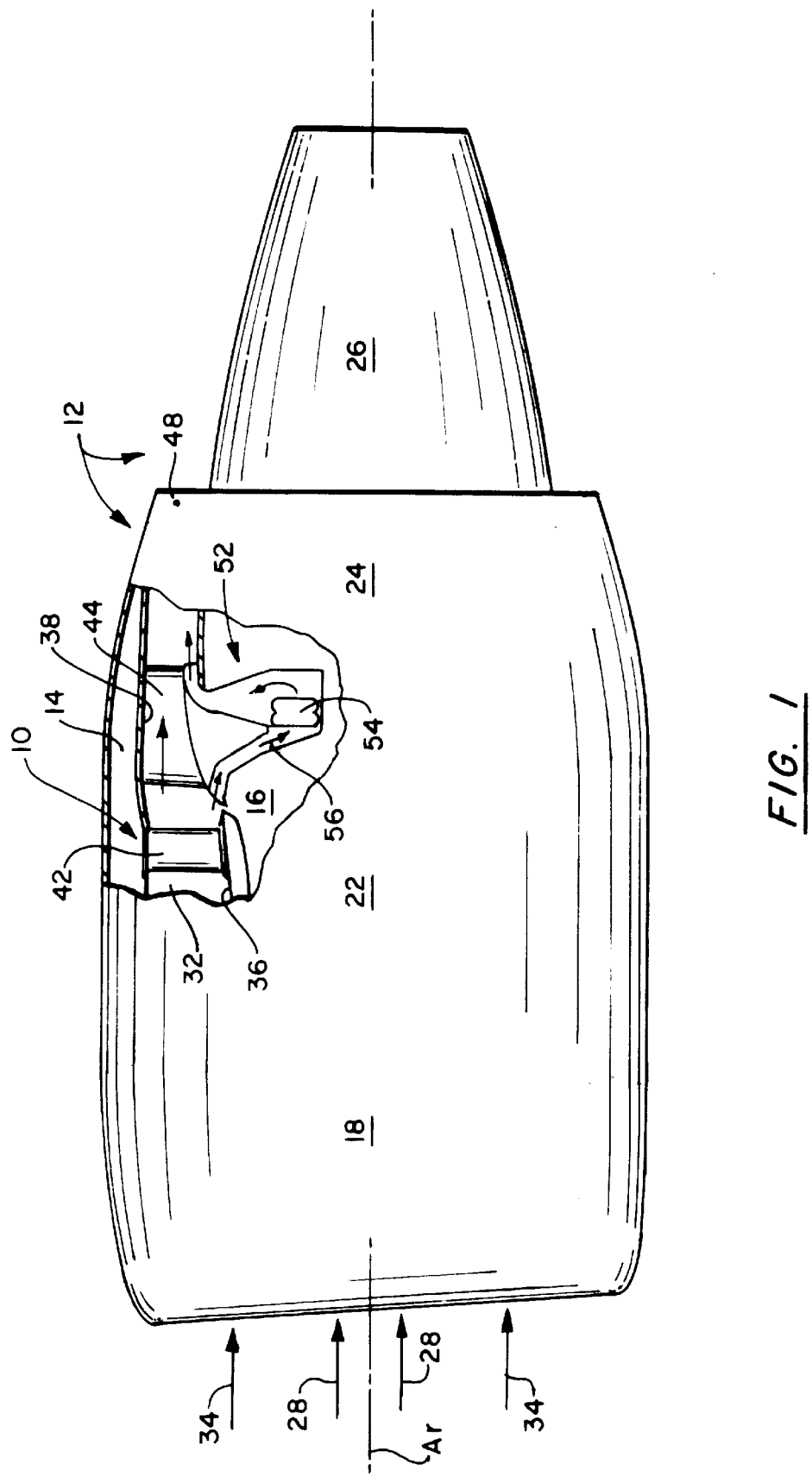
FIG. 1 is a side elevation schematic view of a gas turbine engine partially broken away to show a heat exchanger system in flow communication with a fan bypass duct.

FIG. 1 is a side elevation view of an axial flow rotary machine such as a gas turbine engine 10. The engine is disposed within a housing, commonly referred to as a nacelle 12. The nacelle circumscribes the engine. The nacelle includes compartments for auxiliary equipment such as a nacelle fan compartment 14 and a nacelle core compartment 16. The nacelle is adapted to provide an aerodynamic housing for the engine.

The engine has an axis of rotation Ar and is formed of a fan section 18, a compressor section 22, a combustion section 24 and a turbine section 26 whose relative locations are shown in FIG. 1. A primary flow path 28 for working medium gases extends rearwardly through these sections of the engines. The primary flow path enters the engine at the inner most portion of the inlet to the engine. The nacelle core compartment extends circumferentially about the engine and is spaced radially inwardly from the nacelle fan compartment leaving a fan bypass duct 32 therebetween. A secondary flow path 34 for working medium gases extends rearwardly through the bypass duct and outwardly of the secondary flow path.

The fan bypass duct is bounded by an inner wall 36 and an outer wall 38. The inner wall and outer wall extend circumferentially about the axis of rotation $A_r$ of the engine. A plurality of fan blades (not shown) extend outwardly across the fan bypass duct to pressurize the working medium gases in the secondary flow path. A plurality of fan exit guide vanes, as represented by the fan exit guide vane 42, extend radially between the inner wall and the outer wall to receive flow that is discharged from the fan blades. A plurality of struts, as represented by the strut 44, are downstream of the fan exit guide vanes. The struts extend radially between the inner wall and the outer wall and are circumferentially spaced for providing structural support to portions of the engine and to the nacelle.

The fan bypass duct 32 has a discharge fan duct 46 downstream of the fan exit guide vanes 42. The fan discharge duct is characterized by a flow path having a negligible loss in total pressure along the flow path and characterized by a static pressure gradient in the rearward direction that is substantially non-existent (that is, the static pressures along the flow path are substantially equal) or that is rising in static pressure as a result of contouring of the flow path. At a location 48 significantly downstream of the fan exit guide vanes and downstream of the fan struts (several feet), the flow is accelerated by a contracting passage causing the adverse pressure gradient to disappear and become positive. A heat exchanger system 52 having a heat exchanger 54 and a flow path 56 for the heat exchanger are disposed in the core compartment 16.

Figure 2:
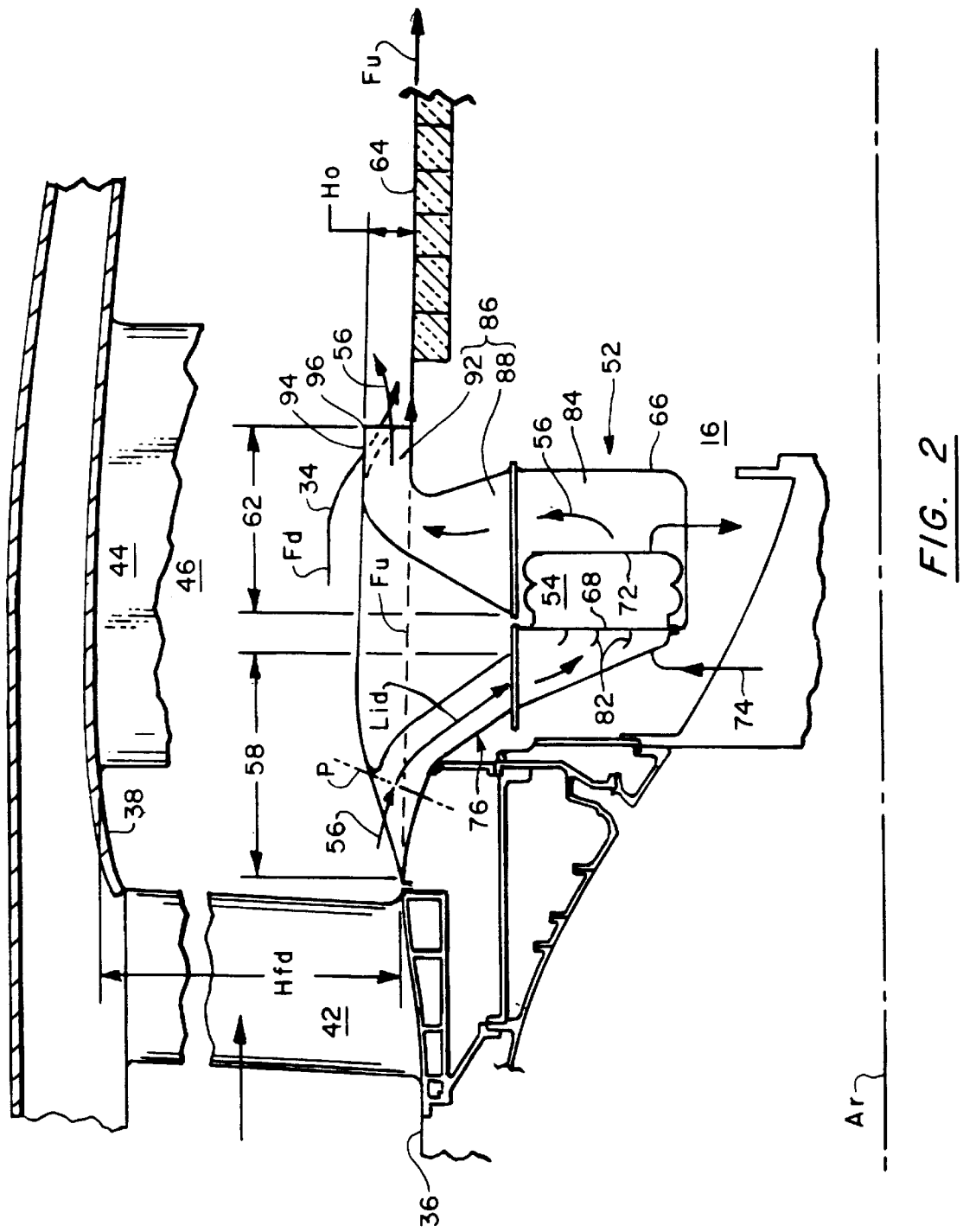
FIG. 2 is an enlarged schematic view of a portion of the engine shown in FIG. 1.

FIG. 2 is an enlarged schematic view of a portion of the engine shown in FIG. 1 showing the heat exchanger system 52. The heat exchanger system is immediately downstream of the array of fan exit guide vanes 42 and is disposed between a pair of the fan struts 44 which are spaced circumferentially. The fan struts are broken away for clarity to show the relationship of the heat exchanger system to the inner wall 36, the outer wall 38 and the secondary flow path 34 for working medium gases. The secondary flow path has lines of flow extending along such walls which include flow lines Fd disturbed by the heat exchanger system and flow lines Fu undisturbed by the heat exchanger system with the undisturbed flow lines having a wall flow characteristic (analogous to a boundary layer in axisymmetric flow) having a thickness Bu at each axial location.

The heat exchanger system has an inlet 58 and an outlet 62. A composite liner 64 for noise suppression is immediately adjacent to the outlet of the heat exchanger system at the inner wall and extends in the downstream direction. The distance between the two is less than the height of the heat exchanger system from the inner wall of the fan duct.

A cavity 66 is disposed in the core compartment of the nacelle. The heat exchanger is disposed in the cavity. The heat exchanger has an inlet 68 and an outlet 72 for the cooling air flow path 56. A flow path 74 for a working medium fluid is in flow communication with the heat exchanger. The hot fluid is in flow communication with components requiring cooling. Examples of working medium fluids for carrying heat to the heat exchanger are engine fuel and engine lubricating oil which receive heat from components through which the working medium passes.

The flow path 56 for cooling air of the heat exchanger system extends through the inlet and outlet of the heat exchanger. The flow path is uninterrupted by valving. The term "uninterrupted" means that the flow path is continuous under all operative conditions of the engine. As will be realized, portions of the structure disclosed herein might be used advantageously with a system having an interrupted flow path.

The flow path 56 for cooling air is in flow communication through the inlet 58 to the heat exchanger system with the secondary working medium flow path in the fan discharge duct. An inlet duct 76 extends from the inlet plane P and has a length Lid. The inlet duct has a first (inner) wall 78 and a second (outer) wall 79.

A first radially extending conduit 80 extends in the cavity 66 from the inlet duct 76 to the heat exchanger inlet 68 placing the inlet 68 in flow communication with the inlet duct. The first conduit has a plurality of radially spaced turning vanes 82 which extend from the heat exchanger axially across a portion of the conduit. This leaves the remaining axial portion of the first conduit open to the flow of working medium gases in a substantially radial direction and in the axial direction through the heat exchanger.

The outlet 62 of the heat exchanger system 52 includes a second conduit 84. The second conduit 84 extends radially and is in flow communication through the heat exchanger 54 with the first conduit 80. The outlet includes an exhaust passage 86. The exhaust passage has a first portion 88 which is in flow communication with the second conduit. The first portion extends radially outwardly. A second portion extends axially rearwardly and terminates in a lobed mixer 92. The lobed mixer has an outlet section 96 at its end. The lobed mixer is spaced outward by a radial height Ho from the undisturbed flow line Fu at the inner wall 36 of the fan duct 46. Accordingly, the outlet section provides at its innermost surface a reference surface for locating the undisturbed flow line Fu which is circumferentially spaced from this location.

Figure 3:
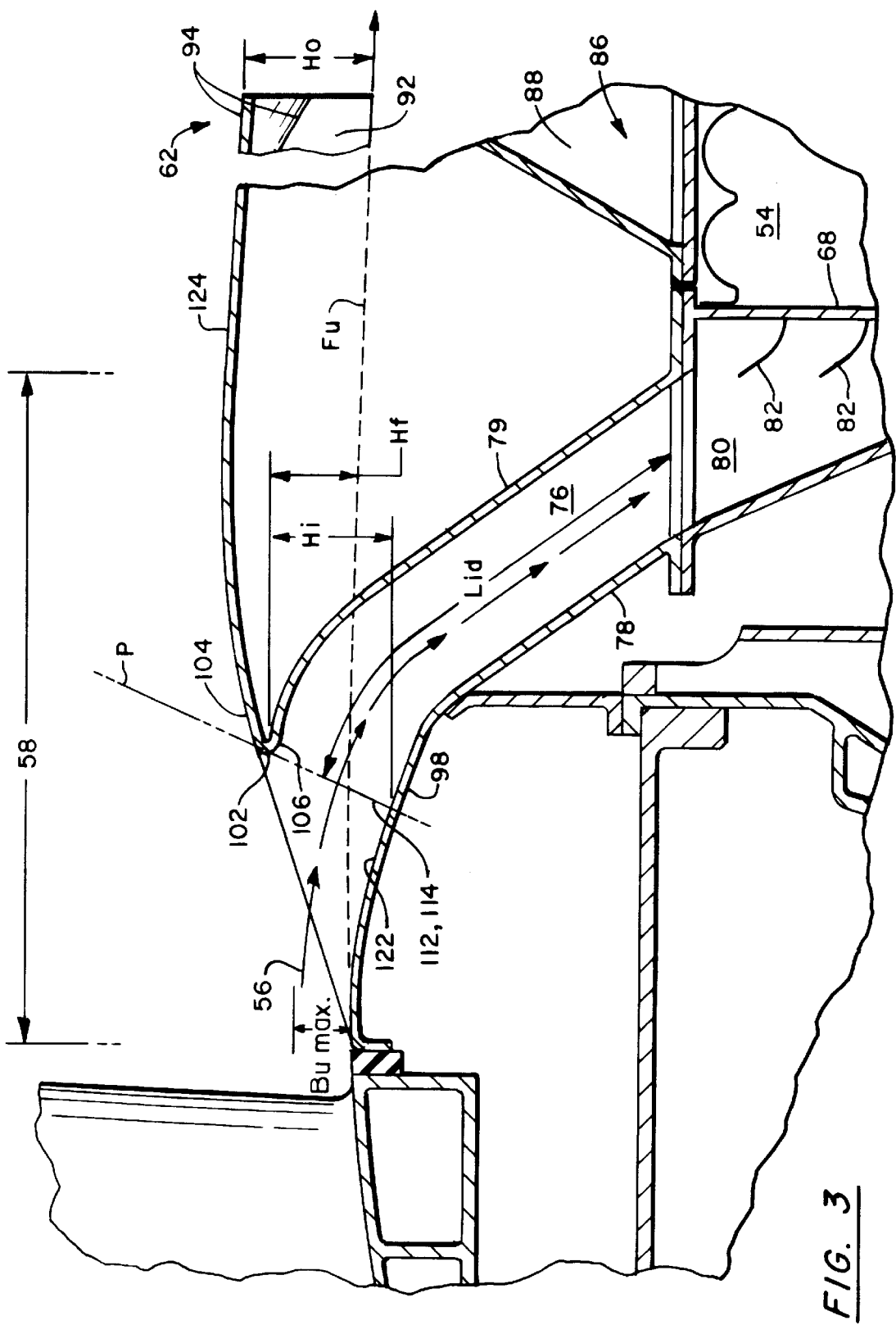
FIG. 3 is an enlarged schematic view of a portion the heat exchanger system shown in FIG. 2.

FIG. 3 is an enlarged view of a portion of the heat exchanger system 52 shown in FIG. 2. The system inlet 58 has an inner wall 98 and an outer wall 102. The inner wall of the inlet and the outer wall of the inlet lie in an inlet plane P which is perpendicular to the flow (flow path 56) entering the inlet. The inner wall and outer wall of the inlet at the inlet plane P are at the location in which the flow is bounded by a wall in the outward direction (the outer wall) and bounded by a wall in the inward direction (the inner wall). This section of flow is commonly referred to as the first covered section of flow. The inner wall extends circumferentially for the width of the inlet. The inner wall is radially inwardly of the undisturbed flow line Fu at the inner wall 36 of the fan duct. The undisturbed flow line is coincident with the inner wall 36 and is spaced radially from the outer wall 38 of the fan duct by a distance Hfd.

The outer wall 102 or lip extends circumferentially as does the inner wall. The outer wall or lip is formed by a first outer surface 104 which extends circumferentially and which diverges radially from the axis Ar of the engine as measured in the downstream direction. The outer wall (lip) has a second inner surface 106 which extends circumferentially and which converges radially from the axis Ar in the downstream direction.

The outer wall 102 is spaced rearwardly from and radially outward from the inner wall 98 of the inlet 58 by a radial height of the inlet Hi. The outer wall is radially outward from the undisturbed flow line a radial distance Hf. The inlet radial height distance Hi is greater than the thickness Bu of the wall flow characteristic. The wall flow characteristic is similar to a boundary layer characteristic for axisymmetric flow and refers to a region of unsteady flow with three-dimensional aspects adjacent to the inner wall 36. The unsteady nature and three dimensional aspects of the flow results from the location of the heat exchanger system 52 immediately downstream of the fan exit guide vanes 42 and between the adjacent fan struts 44. As discussed below, the exposure ratio, aspect ratio, and penetration ratio of the inlet are important parameters for gauging the exposure of the heat exchanger system to potential foreign object damage and the losses associated with disturbance of the working medium flow path by the heat exchanger system.

As shown in FIG. 3, the inlet has an exposure ratio to foreign objects in the oncoming flow that is the ratio of the distance Hf of the inlet from the inner wall of the fan duct (undisturbed flow line Fu) to the total radial distance Hi of the inlet. This distance is less than or equal to (that is, not greater than) seventy percent (Hf/Hi≦0.70). The penetration ratio is the ratio of the exposed radial height Hf of the inlet to the height of the fan duct Hfd and is not greater than fifteen percent (Hf/Hfd≦0.15) and, in one embodiment, not greater than ten percent (Hf/Hfd≦0.10). The aspect ratio is the ratio of the width W of the heat exchanger inlet (see FIG. 4) divided by the height to the outer wall Hf of the inlet in the radial direction and is less than fifty (50) percent and in one embodiment, less than twenty (20) percent.

Figure 4:
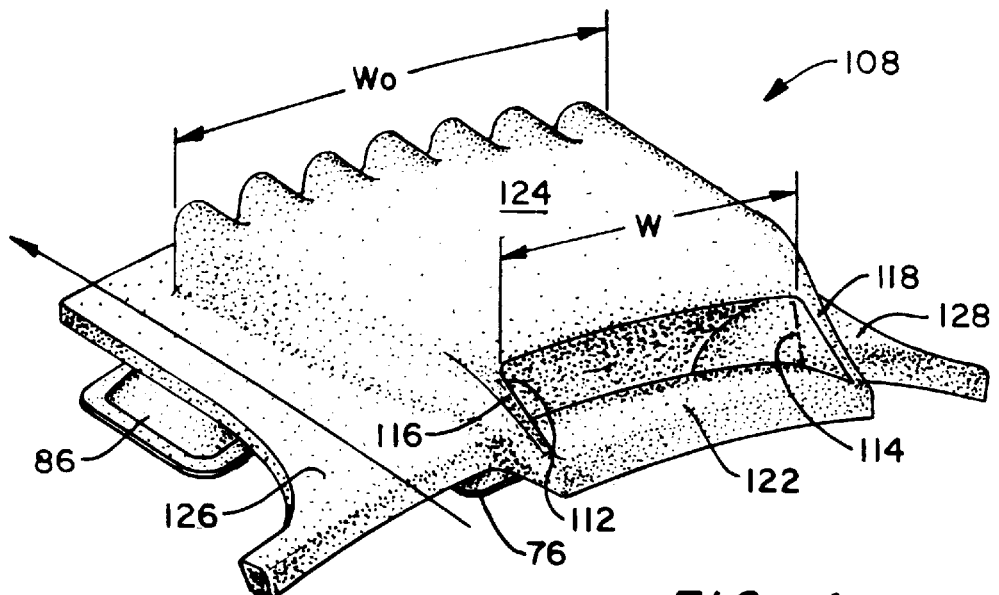
FIG. 4 is a perspective view of the inlet and outlet module for the heat exchanger system shown in FIG. 2.

FIG. 4 is a perspective view of a portion of the heat exchanger system 52 referred to as the inlet and outlet module 108.

As shown in FIG. 3 and FIG. 4, the inlet 58 includes a first side 112 and a second side 114 at the intersection of the inlet plane P with the inlet-outlet module. A first sidewall 116 and a second sidewall 118 extend from the inner wall 98 and the outer wall 102 of the inlet 58. The sidewalls extend in the upstream direction to the inner wall 36 of the fan duct 32. Each sidewall decreases in height in the upstream direction until it reaches the inner wall of the fan duct. An inlet ramp 122 is a curved wall that extends forwardly in the upstream direction from the inner wall of the inlet to the inner wall of the fan duct. The inlet ramp extends circumferentially between the sidewalls to define a smooth transition from the fan duct into the inlet.

The inlet 58 has a mass flow ratio characteristic which is no greater than seventy-five percent (MFR≦0.75) under all operative conditions of the engine. The mass flow ratio characteristic for a particular operative condition of the engine is defined for the inlet at the first covered section at the inlet plane P and is the actual flow through the first covered section into the heat exchanger flow path divided by the product of the density and velocity of the free stream flow multiplied by the area of the first covered section. In one particular embodiment, the MFR was approximately fifty (50) percent under all operative conditions.

As mentioned, the inner duct 76 extends from the inlet 58. The inner wall of the inlet duct extends from the inner wall 98 of the inlet. The outer wall of the duct extends from the outer wall 102 of the inlet. Each of the walls separately converges radially toward the axis Ar in the downstream direction to create a sudden drop below the undisturbed line of flow Fu of the working medium gases.

The inlet and outlet module 108 has sidewalls 116,118 extending rearwardly which are a continuation of the first sidewall and the second sidewall. A flow path wall 124 extends between the sidewalls 116,118 and rearwardly to the lobed mixer 94 from the outer surface 104 of the outer wall 102 at the first covered section. The inlet has a width W which extends between the sidewalls at the inner wall and is constant for the inlet. The inlet-outlet module 108 has a width Wo at the outlet 62 which extends between the first sidewall and the second sidewall. The width Wo is greater than the width W. The aspect ratio of the outlet is the height Ho of the outlet divided by the width Wo and is less than twenty-five (25) percent and, in one embodiment, less than twenty (20) percent. A first circumferentially extending surface 126 extends from the first sidewall 116 and a second circumferentially extending surface 128 extends from the second sidewall 118 to define the inner wall 98 of the fan bypass duct 32 between the fan struts 44. These surfaces also provide references for the undisturbed flow line Fu. A strut profile shape is formed in each of the circumferentially extending surfaces to adapt the inlet-outlet module to abuttingly engage the fan strut which is partially broken away for clarity in FIG. 2.

Figure 5:
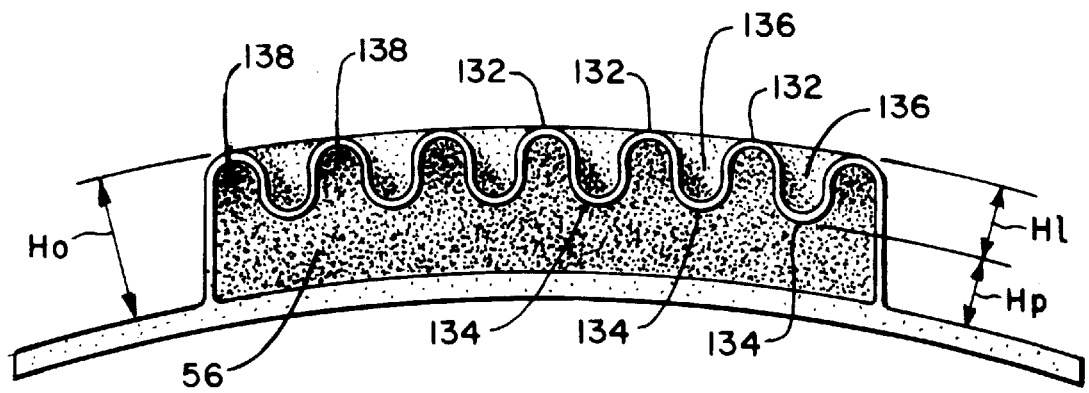
FIG. 5 is an end view taken along the lines 5—5 of FIG. 1 showing the outlet of the heat exchanger system with a portion of the engine broken away for clarity.

As shown in FIG. 5, the ratio of the height Hi of the lobed mixer 94 to the spaced apart distance of the mixer Hp from the inner wall is one. The lobed mixer is formed of a plurality of lobe peaks 132 that are concave with respect to the exhaust flow. Each lobe peak is spaced circumferentially one from the other. A plurality of lobe valleys 134 are disposed inwardly of and joined to the lobe peaks. The lobe valleys are convex to the exhaust flow path 56 of the heat exchanger system and concave 34 to the working medium flow path. Each lobe valley extends between a pair of lobe peaks to define a plurality of axially extending channels 136 that also extend radially inwardly. The channels 138 for the exhaust flow path of the heat exchanger system only extend axially rearwardly.

During operation of the gas turbine engine 10 shown in FIG. 1, working medium gases are flowed along the primary flow path 28 and the secondary flow path 34 for working medium gases. Heat is transferred from various components to the cooling fluid which is flowed along the flow path 74 to the heat exchanger 54. Cooling air is flowed along the flow path 56 from the fan duct 46 continuously through the heat exchanger under all operative conditions of the engine. The flow path for the heat exchanger system extends through the inlet 58 including the inlet duct 76, the first and second conduits 82,84 to the heat exchanger and through the outlet 64. The flow path 56 is uninterrupted under all operative conditions. No valving is required to modulate the flow. This provides a simple system for cooling, avoiding the cost, complexity and weight associated with supplying valves and controlling the valves to such a heat exchanger system.

Under operative conditions, an adverse static pressure gradient exists between axial locations on the inner wall 36 of the fan duct having undisturbed lines of flow Fu, that is locations whose flow is not disturbed by the heat exchanger system 52. Cooling air is passed through the inlet 58 to the system at the inner wall of the fan duct. As mentioned, the inlet has a mass flow ratio characteristic at the inlet which is no greater than seventy-five percent (MFR≦0.75) and, in one embodiment, was slightly less than fifty percent (MFR≦0.50). In addition, the radial height Hi of the inlet is greater than the wall flow characteristic Bu. As a result, flow entering the heat exchanger experiences a static pressure rise sufficient to the drive flow through the heat exchanger system. Total pressure recovery is high because the height Hi of the inlet is greater than the wall flow characteristic height Bu. The length Lid of the inlet duct 76 provides for mixing of any separated flow that occurs at the inlet. This enables a further pressure recovery in the form of a static pressure rise at that location.

The rise in static pressure at the inlet 58 drives the captured gases along the flow path 56 for the heat exchanger system 52. Flow occurs even though an adverse static pressure gradient exists in the fan duct 46 along an undisturbed flow line between the inlet 58 and outlet 62. This enables construction of a heat exchanger system having a relatively short length (in one embodiment, about one foot) as compared with those heat exchanger systems which must rely on a static pressure difference along an undisturbed flow line in the fan duct between the inlet axial location and the outlet axial location (several feet) or as compared to constructions that use a low pressure compartment as a sump for gases discharged from the working medium flow path. In addition, the sidewalls 116, 118 of the inlet ramp 122 block side flow from the ramp and preserve the static pressure rise that is beginning to occur at the ramp of the inlet 58.

Another advantage of the present design and method of operating the engine is the level of drag experienced caused by the heat exchanger system 52 projecting into the working medium flow path. The aspect ratio of the heat exchanger inlet is not greater than twenty percent and the outlet is not greater than twenty-five percent. In addition, the projection ratio of the heat exchanger system into the flow path is not greater than ten percent of the height of the working medium flow path. This results in acceptable levels of drag and a concomitantly small loss in energy as the working medium gases 34 in the fan bypass duct 32 sweep by the inlet and outlet module 126 of the heat exchanger system 52.

In addition, the low aspect ratio and projection ratio of the inlet and outlet module 126 into the working medium flow path 34 decreases the possibility of foreign object damage and ingestion. This reduces the possibility of blockage of the heat exchanger with ice and other debris earlier ingested into the working medium flow path of the engine as compared to designs having a greater projection ratio and a larger aspect ratio for the inlet. The ramp 22 and inlet duct 76 provide a sudden drop below the undisturbed flow line Fu at the inlet 58. This causes the foreign objects in the mainstream flow adjacent the flow entering the inlet to sweep past the inlet to the heat exchanger system. In addition, the inlet is disposed at the inner wall 36 of the fan duct. Foreign objects are generally centrifuged outwardly with a greater incidence of foreign object damage occurring in the region above a ten percent projection than within a ten percent projection by the inlet into the fan duct. Thus, the inlet is greater in size than the wall flow characteristic Bu but small enough so that many foreign objects will sweep by the inlet.

Ice is a particular problem occurring at high altitude operation or as the aircraft passes through hail and ice storms. Chunks of ice that have a diameter greater than the projection of the inlet into the fan duct 32 will strike the entrance to the fan duct and fragment at the inlet 58. The region of the outer wall of the inlet has increased thickness of about four to six times the thickness of interior walls.

The method of operating the engine 10 includes passing the cooling air of the heat exchanger flow path 56 through the inlet 58 and ducting the cooling air sharply downward to impede the ingestion of foreign objects as mentioned above. It also causes foreign objects, such as ice, to strike the walls 79 and other structure, such as the vanes 82, bounding the flow path and to fragment on the interior of the inlet duct 76 and in the first conduit 80 in the heat exchanger cavity 66. For example, these particles will strike the inlet guide vanes 82 to the heat exchanger as the particles move radially inwardly and, if moving with sufficient momentum, may strike the bottom of the cavity prior to striking the inlet to the heat exchanger which avoids damage to the more delicate structure of the heat exchanger.

Another advantage of having the flow path extend sharply inwardly and sharply outwardly as compared to the axial length of the ducts is the compactness of the heat exchanger system. The heat exchanger inlet and outlet module has a length of about one foot for one embodiment. The length to height ratio of the system is about one (L/H<0.9–1.1).

After the cooling air is heated in the heat exchanger 54, the heated air is flowed radially outwardly through the second conduit and into the exhaust passage 86. The first portion 88 extends radially outwardly and the second portion 92 extends axially in the downstream direction to direct rearwardly the exhausted gases from the heat exchanger. The exhaust gases from the heat exchanger flow path 56 encounter the lobed mixer 94. Operation of the engine includes mixing these heated exhaust gases 46 with the cooler working medium gases from the fan duct. The lobed mixer promotes the mixing, ensuring that the energy from the gases enters the working medium flow path where it usefully increases thrust heat adjacent structure, such as might occur in constructions where heat is transferred to metal plates which shield the composite wall of the nacelle and which is then transferred to other locations of the engine. These heated gases increase the energy of the gas stream and, in one embodiment, make up for the loss in energy caused by flowing the gases through the heat exchanger flow path.

Another advantage is the durability of downstream structure 64 that results from the lobed valleys 136 of the mixer 94 that are directed radially inwardly. The lobed valleys duct air having a dynamic head or velocity head (one half density multiplied by the square of the velocity) which is much greater than the dynamic head of the heated air 56 being exhausted from the heat exchanger system 52. In one construction, the dynamic head of the working medium gases is four times greater than the dynamic head of the heat exchanger system gases. As a result, the flow path gases 34 drive inwardly into the exhaust gases 56, providing a screen of cool air to the structure rearwardly of the heat exchanger system 52. This screen of air blocks the gases from the heat exchanger from contacting the wall with curtains of cool air adjacent the wall. This avoids over-temperaturing any adjacent composite structure 64, such as the sound absorbing structure, and avoids the necessity for metal protective shields disposed in the flow path to protect such structure from over-temperature conditions.

A particular advantage of the modular construction of the heat exchanger inlet and outlet is the method by which the inlet and outlet module 108 may be quickly and efficiently formed. The inlet and outlet module is a cast construction. Use of the casting technique is enhanced by the relatively small size of the casting. The cast construction allows for precisely contoured passages and for a robust construction at critical locations as compared with devices which might be formed of thin sheet metal. In addition, the casting ensures the relationship between the flow path and the aerodynamic inlet meets the requirements of the aerodynamic design. The design provides for easy replacement in case of injury to the inlet and outlet module.

Fabricating the inlet and outlet module as a casting has other advantages. For example, the complex shape of the flow paths are easily formed time after time. This avoids the need for many different kinds of tooling to form the complex shapes associated with sheet metal work and welding of the sheet metal sections.

Another advantage of a cast module for the inlet and outlet is the strength-to-weight ratio of the design. Casting allows for different thickness material at different locations for the inlet and outlet module enabling the module to have thicknesses tailored so that it is thicker at the leading edge and other locations where needed, such as inlet and outlet wall and the sides, and with thinner walls with ribs in locations where the strength is not needed to resist foreign object damage or for other requirements. In addition, the casting is in a one-piece construction having an overall stiffness of the structure that is greater than if the part were made from many pieces.

The one-piece construction is also lighter in weight, eliminating flanges needed to attach parts together in constructions of made of several components whether the components are cast or welded sheet metal. An aerodynamic advantage results by eliminating steps or gaps that occur between components and that cause aerodynamic losses. The critical aerodynamic alignment between the outlet 58 and the inlet 62 are maintained.

Finally, the modular inlet and outlet design provides for ease of installation of one or more of the modules within the engine. For example, some engine constructions have a first inlet and outlet module which is in flow communication with a first heat exchanger and a second inlet and outlet module which is in flow communication with a second heat exchanger. Either of these modules is easily replaced or easily removed to permit inspection of the heat exchanger cavity for blockage and for foreign object damage should the engine have passed through severe hailstorms. Finally, an advantage in installation and removal of the module is the interchangability of modules because the design is a cast one-piece construction that maintains alignment between the exit and inlet.

Although the invention has been shown and described with respect to detailed embodiments thereof, it should be understood by those skilled in the art that various changes in form and detail thereof may be made without departing from the spirit and the scope of the claimed invention.

What is claimed is:

1. An inlet outlet module for a heat exchanger system for a gas turbine engine that is disposed about an axis of rotation Ar, the engine having a primary annular flow path for working medium gases disposed about the axis Ar and a secondary annular flow path for working medium gases disposed about the primary flow path, the secondary flow path having a fan duct which is bounded by walls including an inner wall, an outer wall, a radial bifurcator wall extending between the inner wall and the outer wall, the secondary flow path further having lines of flow extending along such walls which include flow lines Fd disturbed by the heat exchanger system and flow lines Fu undisturbed by the heat exchanger system, the inlet and outlet module having a pair of axially spaced surfaces which are coincident with the undisturbed flow line Fu, which comprises:

an inlet having a first covered section at an inlet plane P having
an inner wall extending for a width W which is inwardly of the undisturbed flow line Fu, an outer wall which extends circumferentially a width W, which is spaced rearwardly from and radially outward from the inner wall of the inlet by an inlet radial height Hi, and radially outward from the undisturbed flow line an exposed radial height Hf, the inlet having an exposure ratio which is the ratio of the exposed radial height Hf to the inlet radial height Hi and which is not greater than seventy percent (Hf/Hi≦0.7), and the inlet having an aspect ratio which is the ratio of an exposed radial height Hf to the width W of the inlet which is not greater than one half (Hf/W≦0.50);

an outlet having an exhaust passage which is spaced axially from the inlet and terminating at an outlet section, the outlet having an outermost wall which is radially outwardly of the undisturbed flow line a maximum radial height Ho and having a width Wo and having an aspect ratio which is not greater than one-half (Ho/Wo≦0.50);

a first sidewall and a second sidewall which extend from the outlet section to the outer and inner walls of the inlet and a flow path surface wall which forms the outermost portion of the outlet extends between the sidewalls and extends from the outlet section to the outer wall of the inlet;

wherein the module is a one piece casting and has an inlet having a thickness adjacent the outer wall of the inlet which is at least four times the thickness of adjacent walls on the interior of the module, the module having acceptable levels of drag and foreign object damage tolerance which results in part from the exposure ratio of less than seventy percent and the aspect ratio of less than fifty percent.

2. The heat exchanger system for a gas turbine engine as claimed in claim 1 wherein the aspect ratio is not greater than twenty-five percent (Hf/W≦0.25).

3. The heat exchanger system for a gas turbine engine as claimed in claim 1 wherein the system includes an inlet duct extending from the inlet plane P which is in flow communication with the inlet, the inlet duct having a length Lid and a first inner wall and a second outer wall, the inner wall of the duct extending from the inner wall of the inlet, the outer wall of the duct extending from the outer wall of the inlet lip, each separately converging radially toward the axis Ar in the downstream direction to create a sudden drop below the undisturbed flow line Fu.

4. The heat exchanger system for a gas turbine engine as claimed in claim 2 wherein the system includes an inlet duct extending from the inlet plane P which is in flow communication with the remainder of the inlet, the inlet duct having a length Lid and a first inner wall and a second outer wall, the inner wall of the duct extending from the inner wall of the inlet, the outer wall of the duct extending from the outer wall of the inlet lip, each separately converging radially toward the axis Ar in the downstream direction to create a sudden drop below the undisturbed flow line Fu.

5. The heat exchanger system for a gas turbine engine as claimed in claim 1 wherein the inlet further includes an inlet ramp which extends in the upstream direction from the inner wall of the inlet to the inner wall of the fan duct.

6. The heat exchanger system for a gas turbine engine as claimed in claim 5 wherein the inlet has a first side wall and a second side wall which extend from the axial location of the inner wall to the outer wall and bound the ramp, the side walls decreasing in height in the upstream direction to the inner wall of the fan duct wherein sidewalls help preserve the rise in static pressure which occurs on the ramp upstream of the first covered section.

7. The heat exchanger system for a gas turbine engine as claimed in claim 1 wherein cooling air is exhausted from the heat exchanger system under operative conditions and wherein the outlet further has a mixer which extends upstream from the outlet section, the mixer having a plurality of inwardly extending channels which are adapted to flow working medium gases from the flow path for the fan duct with a radially inward component of velocity toward the inner wall of the fan duct to mix the working medium gases with the cooling air exhausted from the heat exchanger system and wherein the mixer avoids unacceptable heating of adjacent downstream structure of the heat exchanger system and increases thrust of the engine by intermixing the heated gases from the flow path of the heat exchanger with the working medium gases to increase the energy of the working medium gases.

8. The heat exchanger system for a gas turbine engine as claimed in claim 7 wherein the mixer has a plurality of lobe peaks that are concave with respect to the exhaust flow, each spaced circumferentially one from the other and a plurality of lobe valleys inwardly of the lobe peaks that are convex with respect to the exhaust flow path of the heat exchanger system and concave with respect to the working medium flow path, each lobe valley extending between a pair of lobe peaks to define a plurality of axially extending channels, the channels for the exhaust flow path of the heat exchanger system extending rearwardly and the channels for the fan duct flow path extending radially inwardly.

9. The heat exchanger system for a gas turbine engine as claimed in claim 1 wherein a first circumferentially extending surface extends from the first sidewall and a second circumferentially extending surface extends from the second sidewall to define the inner wall of the fan duct and wherein each of the circumferentially extending surfaces adapt the inlet-outlet module to abuttingly engage radial structure in the fan duct.

* * * * *